US011825022B1

(12) United States Patent
Lim

(10) Patent No.: US 11,825,022 B1
(45) Date of Patent: Nov. 21, 2023

(54) AI AVATAR COACHING SYSTEM BASED ON FREE SPEECH EMOTION ANALYSIS FOR MANAGING IN PLACE OF CS MANAGERS

(71) Applicant: CS Sharing Inc., Seoul (KR)

(72) Inventor: Ji Eun Lim, Seogwipo-si (KR)

(73) Assignee: CS Sharing Inc., Seoul (KR)

( * ) Notice: Subject to any disclaimer, the term of this patent is extended or adjusted under 35 U.S.C. 154(b) by 0 days.

(21) Appl. No.: 17/974,536

(22) Filed: Oct. 27, 2022

(30) Foreign Application Priority Data

Oct. 19, 2022 (KR) .......................... 10-2022-0134543

(51) Int. Cl.
  *H04M 3/00* (2006.01)
  *H04M 3/51* (2006.01)
  *G06Q 30/016* (2023.01)

(52) U.S. Cl.
  CPC ........ *H04M 3/5175* (2013.01); *G06Q 30/016* (2013.01); *H04M 3/5133* (2013.01); *H04M 3/5183* (2013.01); *H04M 2201/405* (2013.01); *H04M 2203/1025* (2013.01); *H04M 2203/403* (2013.01)

(58) Field of Classification Search
  CPC ............. H04M 3/5235; H04M 3/5183; H04M 3/5191; H04M 3/5175; H04M 3/5133; G06Q 30/016
  See application file for complete search history.

(56) References Cited

U.S. PATENT DOCUMENTS

2014/0314225 A1* 10/2014 Riahi ...................... H04L 51/02
  379/265.09

* cited by examiner

*Primary Examiner* — Rasha S Al Aubaidi
(74) *Attorney, Agent, or Firm* — Park, Kim & Suh, LLC

(57) ABSTRACT

Disclosed is an AI avatar coaching system based on a free speech emotion analysis for acting for CS managers. The AI avatar coaching system includes: an AI avatar coach server generating an AI avatar coach video for practical counseling training, and providing the generated AI avatar coach video; an educated/inexperienced counselor terminal receiving and outputting the AI avatar coach video provided from the AI avatar coach server; a purchase customer terminal performing a voice call for a counseling inquiry of a purchase customer; a counselor terminal performing the voice call for a counselor to perform counseling processing for the counseling inquiry of the purchase customer; and an omni channel customer/company consulting service server setting a voice call session for the voice call between the purchase customer terminal and the counselor terminal, and transmitting a report for the counseling inquiry and the counseling processing, in order to act for counseling services for multiple selling company customers. By the AI avatar coaching system based on a free speech emotion analysis for acting for CS managers, there is an effect that a counseling video of an experienced counselor is configured to be simulated into an avatar video and provided to educated/inexperienced counselors to learn a counseling/response method and effectively train the counselors through a specific practical cases.

2 Claims, 2 Drawing Sheets

AI AVATAR COACHING SYSTEM BASED ON FREE SPEECH EMOTION ANALYSIS FOR MANAGING IN PLACE OF CS MANAGERS

CROSS-REFERENCE TO RELATED APPLICATIONS

This application claims the priority of Korean Patent Application No. 10-2022-0134543 filed on Oct. 19, 2022, in the Korean Intellectual Property Office, the disclosure of which is incorporated herein by reference.

BACKGROUND OF THE INVENTION

Field of the Invention

The present invention relates to an AI avatar coaching system, and particularly, to an AI avatar coaching system based on a free speech emotion analysis for acting for CS managers.

Description of the Related Art

Customer Service (CS) may be an opportunity to enhance an image of a company and increase sales in a company, while it is an important issue that can lead to a crash of the company's image, a decline in sales, and a crisis of the company.

However, it is difficult to operate CS systematically in general small and medium-sized companies, not large companies, and it is difficult to operate the CS efficiently.

As a result, a business model that can outsource and process the CS is required, and a lot of large companies outsource and leave the CS to specialists in addition to the small and medium-sized companies.

However, CS specialists also produce a lot of problems by acting as CS tasks of many companies. For example, while dealing with CS tasks of too many sales company customers, there are problems that companies and products are too diverse and increasing, and they are not familiar with various products and companies, so there is a lot of rigidity claims, and the claims may lead to frequent turnover of counselors.

There is a problem that the burden of education on new counselors increases, and the quality of the counselor's service is lowered. In addition, the small and medium-sized companies, and e-commerce companies are experiencing various difficulties with increasing inquiries and complaints, and they are experiencing a vicious cycle of hiring non-skilled counselors to respond to the difficulties to cause wrong counseling and wrongly handled complaints again.

Consequently, the number of CS counselors which should be managed by the CS managers increase, and the CS manager experiences a difficulty of management in a state in which the number of CS managers is small.

Meanwhile, it is not easy to quickly resolve the inquiries that runaway in Monday, peak season and morning time zones.

Therefore, a means for establishing a more efficient CS system which enables chronic problems to be more quickly resolved is required.

SUMMARY OF THE INVENTION

The present invention has been made in an effort to analyze a counseling history by acting for CS managers in which the number of CS counselors which should be managed by CS managers and the number of CS managers is relatively small, and provide an AI avatar coaching system based on AI avatar coaching through a free speech emotion analysis to act for the CS manager, and solve a CS management problem of a CS business world.

An exemplary embodiment of the present invention provides an AI avatar coaching system based on a free speech emotion analysis for acting for CS managers, which may be configured to include: an AI avatar coach server generating an AI avatar coach video for practical counseling training, and providing the generated AI avatar coach video; and an educated/inexperienced counselor terminal receiving and outputting the AI avatar coach video provided from the AI avatar coach server.

Here, the AI avatar coaching system may be configured to further include: a purchase customer terminal performing a voice call for a counseling inquiry of a purchase customer; a counselor terminal performing the voice call for a counselor to perform counseling processing for the counseling inquiry of the purchase customer; and an omni channel customer/company consulting service server setting a voice call session for the voice call between the purchase customer terminal and the counselor terminal, and transmitting a report for the counseling inquiry and the counseling processing, in order to act for counseling services for multiple selling company customers.

In addition, the AI avatar coaching system may be configured to further include: a selling company customer terminal receiving the report for the counseling inquiry and the counseling processing for multiple selling company customers; and a manager terminal receiving the report for the counseling inquiry and the counseling processing.

By the AI avatar coaching system based on a free speech emotion analysis for acting for CS managers, there is an effect that a counseling video of an experienced counselor is configured to be simulated into an avatar video and provided to educated/inexperienced counselors to learn a counseling/response method and effectively train the counselors through a specific practical cases.

In addition, there is an effect that a voice call is STT-converted to determine a counseling inquiry in real time, and a customer emotion is configured to be accurately determined by using an AI algorithm to automate evaluation and management for numerous voice call counseling.

On the other hand, in particular, there is an effect that the counselor and a purchase customer are automatically separated and recognized through a voiceprint analysis in the counseling video, and the avatar video is simulated by using the automatic separation and recognition, and the emotion of the purchase customer in the counseling video is automatically analyzed and it is determined whether the corresponding counseling is a model counseling case and automatically selected to continuously announce and learn a new case corresponding to a more new and creative counseling and response.

Further, the customer emotion is configured to be classified by the analysis of the voice call to update customer information to ensure information on a customer tendency and flexibly response to the information in advance.

On another hand, there is an effect that a waiting time is generated due to counselor's call runaway or the counseling is configured to be automatically accepted and analyzed by using an AI algorithm even in holidays or nights, and customer satisfactions can be increased by mapping difficulties of counseling and inquiry contents or a previously ensured customer tendency to an experience level of the counselor.

Further, there is an effect that by configuring all counseling inquiries, processing status, and pre-accepted counseling inquiries on an integrated bulletin board to allow the counselors to specifically determine an overall counseling status.

DETAILED DESCRIPTION OF THE PREFERRED EMBODIMENT

Figure 1:
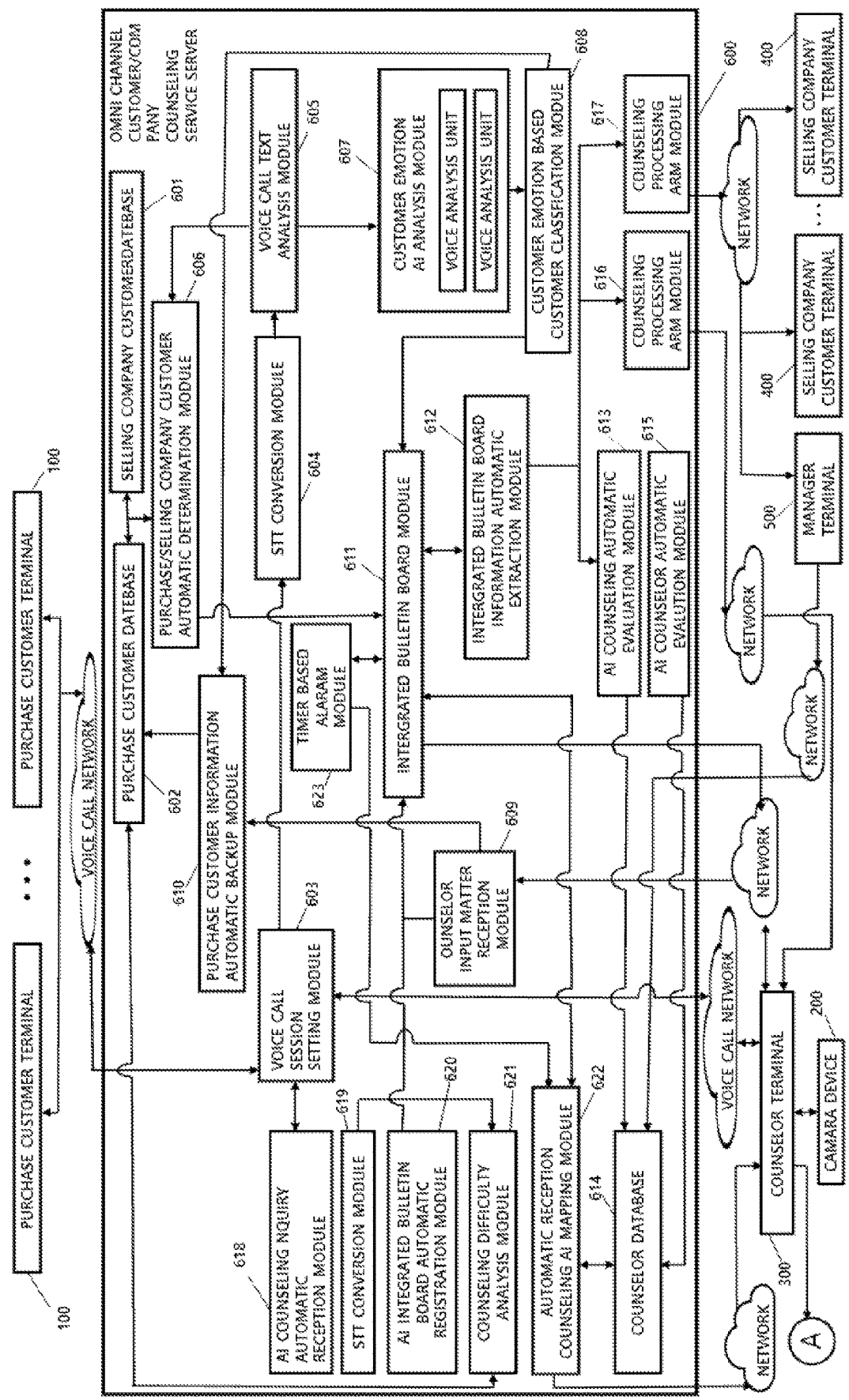
FIGS. 1 and 2 are block diagrams of an AI avatar coaching system based on a free speech emotion analysis for acting for CS managers according to an exemplary embodiment of the present invention.

The present invention may have various modifications and various embodiments and specific embodiments will be illustrated in the drawings and described in detail in specific contents for carrying out the present invention. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one element from another element. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, a preferred embodiment of the present disclosure will be described in detail with reference to the accompanying drawings.

Figure 2:
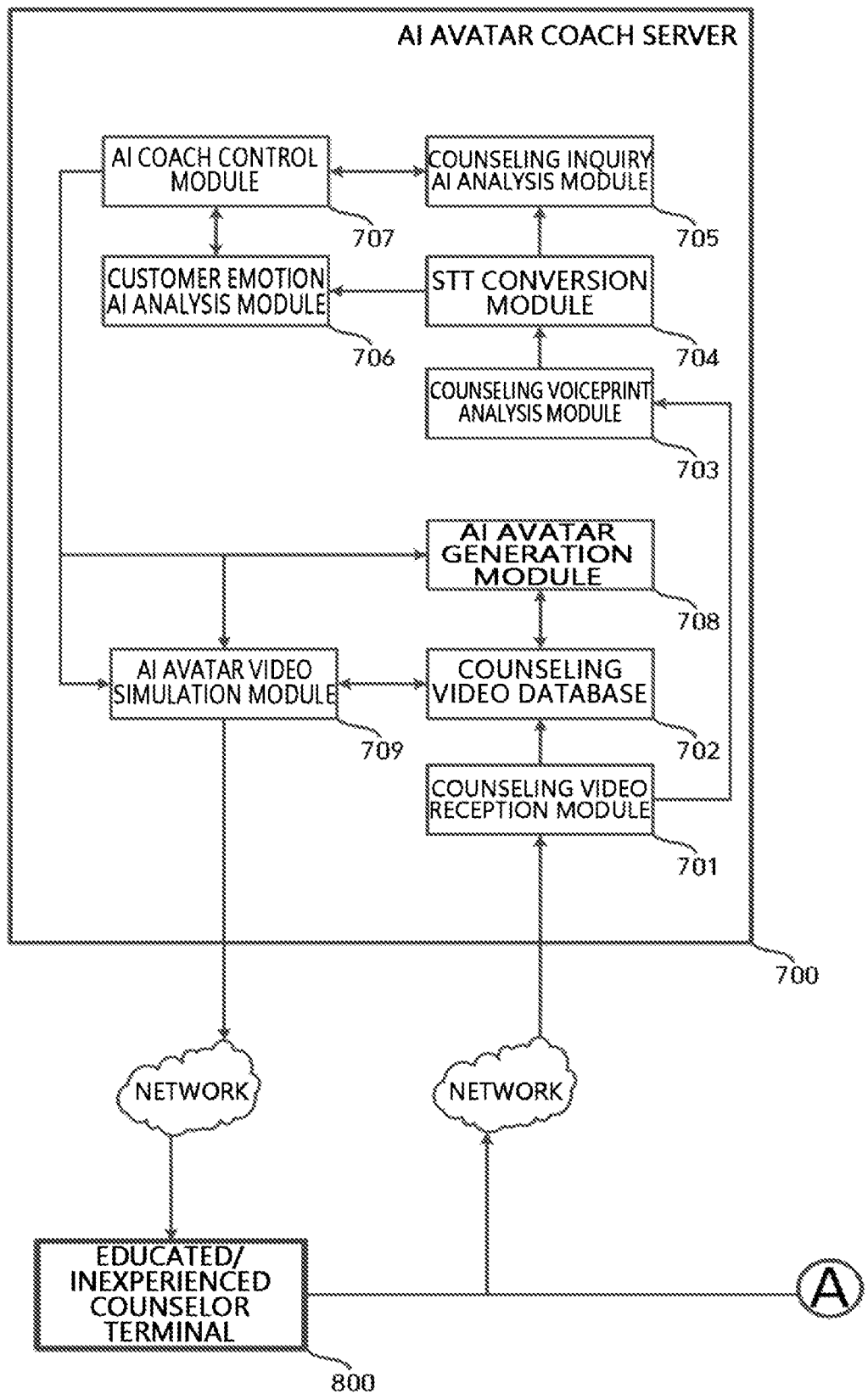

FIGS. 1 and 2 are block diagrams of an AI avatar coaching system based on a free speech emotion analysis for acting for CS managers according to an exemplary embodiment of the present invention.

Referring to FIGS. 1 and 2, the AI avatar coaching system based on a free speech emotion analysis for acting for CS managers according to an exemplary embodiment of the present invention may be configured to include a purchase customer terminal 100, a camera device 200, a counselor terminal 300 a selling company customer terminal 400, a manager terminal 500, an omni channel customer/company counseling service server 600, an AI avatar coach server 700, and an educated/inexperienced counselor terminal 800.

Hereinafter, a detailed configuration will be described.

The purchase customer terminal 100 may be configured to perform a voice call for a counseling inquiry of a purchase customer.

The camera device 200 may be configured to generate transmit a counseling video of a counselor in real time and transmit the generated video to the counselor terminal 300.

The counselor terminal 300 may be configured to perform the voice call for the counselor to perform counseling processing for the counseling inquiry of the purchase customer.

In addition, the counselor terminal 300 may be configured to receive the counseling video from the camera device 200, and transmit the received video to the AI avatar coaching server 700.

The selling company customer terminal 400 may be configured to receive, from the omni channel customer/company counseling service server 600, a report for the counseling inquiry, and the counseling processing for multiple selling companying customers. The selling company customer may be a person who sells goods or services to the purchase customer.

The manager terminal 500 may be configured to receive the report for the counseling inquiry, and the counseling processing from the omni channel customer/company counseling service server 600. Here, the manager may perform a business of managing the counselors and an integrated bulletin board.

The omni channel customer/company counseling service server 600 is a component that acts as the counseling service for multiple selling company customers.

Here, the omni channel customer/company counseling service server 600 may be configure to set a voice call session for the voice call between the purchase customer terminal 100 and the counselor terminal 300.

In addition, the omni channel customer/company counseling service server 600 may be configured to transmit the report for the counseling inquiry, and the counseling processing from the selling company customer terminal 400 and the manager terminal 500.

The omni channel customer/company counseling service server 600 may be configured to include a selling company customer database 601, a purchase customer database 602, a voice call session setting module 603, a speech-to-text (STT) conversion module 604, a voice call text analysis module 605, a purchase/selling company customer automatic determination module 606, a customer emotion AI analysis module 607, a customer motion based customer classification module 608, a counselor input matter reception module 609, a purchase customer information automatic back-up module 610, an integrated bulletin board module 611, an integrated bulletin board information automatic extraction module 612, an AI counseling automatic evaluation module 613, a counselor database 614, an AI counselor automatic evaluation module 615, a counseling processing status automatic alarm module 616, a counseling processing status automatic report module 617, an AI counseling and inquiry automatic reception module 618, an STT conversion module 619, an AI integrated bulletin board automatic registration module 620, a counseling difficulty analysis module 621, an automatic reception counseling AI mapping module 622, and a timer based alarm module 623.

Hereinafter, a detailed configuration will be described.

The selling company customer database 601 may be configured to store selling company customer information for multiple selling company customers.

The purchase customer database 602 may be configured to store purchase customer information for the purchase customer.

The voice call session setting module 603 may be configure to set a voice call session for the counseling between the purchase customer terminal 100 and the counselor terminal 300.

The STT conversion module 604 may be configured to covert the voice call on the voice call session set by the voice call session setting module 603 into a voice call text in real time.

The voice call text analysis module 605 may be configured to analyze the voice call text converted in real time by the STT conversion module 604.

The purchase/selling company customer automatic determination module 606 may be configured to automatically determine the purchase customer and selling company customer of the counseling by using an analysis result of the voice call text analysis module 605.

The customer emotion AI analysis module 607 may be configured to analyze the emotion of the purchase customer by using an AI algorithm based on the analysis result of the voice call text analysis module 605. The customer emotion AI analysis module 607 may be configured to analyze the customer emotion by a voice analysis unit or a keyword analysis unit by using a BERT algorithm. For example, a tone or a size of a voice may be angry or complaining or may also be very satisfied or in a good mood. In addition, a keyword that indicates complaints or dissatisfaction may repeatedly appear or a keyword that indicates a very satisfactory state may also appear.

The customer emotion based customer classification module 608 may be configured to tag and classify the emotion of the purchase customer in real time based on the emotion of the purchase customer analyzed in real time by the AI customer emotion AI analysis module 607. The customer emotion based customer classification module 608 may digitize or grade the purchase customer emotion for each counseling, and classify the purchase customer emotion into very satisfactory, satisfactory, normal, dissatisfactory, and very dissatisfactory.

The counselor input matter reception module 609 may be configured to receive counselor input matters for the purchase customer input on the counselor terminal 300 in real time. Various counselor input matters including unusual matters or unresolved matters for the customer may be received from the counselor terminal 300.

The purchase customer information automatic backup module 610 may be configured to automatically back up the purchase customer emotion classified real time by the customer emotion based customer classification module 608 and the counselor input matters received in real time by the counselor input matter reception module 609 to the purchase customer database 602. As counseling for a specific purchase customer increases, the purchase customer emotion or the counselor input matters for the corresponding purchase customer are accumulated, so detailed and specific information for the corresponding purchase customer may be backed up.

The integrated bulletin board module 611 may be configured to register and post the purchase customer and the selling company customer automatically determined by the purchase/selling company customer automatic determination module 606, and configured to post the purchase customer emotion classified in real time by the customer emotion based customer classification module 608 for each corresponding counseling.

The integrated bulletin board information automatic extraction module 612 may be configured to automatically extract integrated bulletin board information for each counseling posted by the integrated bulletin board module 611 in real time. Here, the integrated bulletin board information may include all information of each counseling posted on the integrated bulletin board.

The AI counseling automatic evaluation module 613 may be configured to automatically evaluate the counseling of each counselor by using the integrated bulletin board information automatically extracted by the integrated bulletin board information automatic extraction module 612.

The AI counseling automatic evaluation module 613 may evaluate the counseling through whether the counseling is satisfactory and whether the counseling is normally processing by using the purchase customer emotion included in the integrated bulleting board information.

The counselor database 614 may be configured to cumulatively store the evaluation result of the AI counseling automatic evaluation module 613 for each counselor.

The AI counselor automatic evaluation module 615 may be configured to automatically evaluate the proficiency of each counselor by using the evaluation result for each counselor accumulatively stored in the counselor database 614, and store the proficiency in the counselor database 614. The proficiency may include proficiency for each specific selling company customer in addition to proficiency as a basic counselor qualification.

The counseling processing status automatic alarm module 616 may be configured to transmit a real-time alarm to the corresponding counselor terminal for the counseling processing status according to the integrated bulletin board information automatically extracted by the integrated bulletin information automatic extraction module.

The counseling processing status automatic report module 617 may be configured to automatically report the counseling processing status according to the integrated bulleting board information automatically extracted by the integrated bulletin board automatic extraction module 612 to the corresponding selling company customer terminal 400 and the manager terminal 500. The selling company customer may monitor a CS processing status of the corresponding selling company through the report.

The f be configured to automatically receive the counseling inquiries of the customer terminal 100 when the voice call session is not set in the voice call session setting module 603. At the night or the holiday or when a call connection is not made due to a lot of counseling inquiry calls, the AI counseling inquiry automatic reception module 618 may automatically receive the counseling inquiry.

The STT conversion module 619 may be configured to STT-convert the counseling inquiry automatically by the AI counseling inquiry automatic reception module 618 in real time.

The AI integrated bulleting board automatic registration module 620 may be configured to automatically register the counseling inquiry STT-converted in real time by the STT conversion module 619 in the integrated bulletin board module 611. The counselor or the manager may determine the counseling inquiry currently crowded and the type, contents, a reception time, etc., thereof through the integrated bulletin board in real time.

The counseling difficulty analysis module 621 may configured to analyze the counseling inquiry and the counseling difficulty in real time by referring to the purchase customer information of the counseling inquiry registered automatically by the AI integrated bulletin board automatic registration module 620 in the purchase customer database 602 and analyzing the counseling inquiry STT-converted by the STT conversion module 619.

In addition the counseling difficulty analysis module 621 may be configured to cumulatively store the evaluation result of the AI counseling automatic evaluation module 613 in the counselor database 614 for each counselor.

The automatic reception counseling AI mapping module 622 may be configured to map the counseling inquiry automatically registered in the integrated bulletin module 611 by the AI integrated bulletin board automatic registration module 620 by selecting a predetermined counselor terminal 300 based on the counseling difficulty of the counseling inquiry analyzed in real time by the counseling difficulty analysis module 6212 and the proficiency of each counselor stored in the counselor database 614.

For example, it may be configured in such a manner that when the counseling difficulty is high, the satisfaction of the purchase customer is met by mapping a counselor having high proficiency as possible, and when the counseling difficulty is low, business efficiency may be configured to increase by mapping a counselor having low proficiency as possible.

The timer based alarm module 623 may be configured to generate an alarm signal by performing a predetermined timer for the counseling inquiry automatically registered in the integrated bulletin board module 611 by the AI integrated bulletin board automatic registration module 620, and transmit the generated alarm signal to the automatic reception counseling AI mapping module 622.

The automatic reception counseling AI mapping module 622 may be configured to receive the alarm signal generated by the timer based alarm module 623, and preferentially map the counseling inquiry of the received alarm signal. That is, the automatic reception counseling AI mapping module 622 may be configured to perform the counseling within a predetermined time by using a timer in order to prevent a predetermined time from being elapsed after the reception.

The AI avatar coach server 700 may be configured to receive the counseling video from the counselor terminal 300, and generate an AI avatar coach video for practical counseling training of the educated/inexperienced counselor 800 by using the received counseling video.

In addition, the AI avatar coach server 700 may be configured to provide the generated AI avatar coach video to the educated/inexperienced counselor 800.

The AI avatar coach server 700 may be configured to include a counseling video reception module 701 a counseling video database 702, a counseling voiceprint analysis module 703, an SST conversion module 704, a counseling inquiry AI analysis module 705, a customer emotion AI analysis module 706, an AI coach control module 707, an AI avatar generation module 708, and an AI avatar video simulation module 709.

Hereinafter, a detailed configuration will be described.

The counting video reception module 701 may be configured to the counseling video from the counselor terminal 400.

The counseling video database 702 may be configured to store the counseling video received by the counseling video reception module 701.

The counseling voiceprint analysis module 703 may be configured to analyze the voice print of the counseling voice in the counseling video stored in the counseling video database 702 in real time. The counseling voiceprint analysis module 703 may automatically recognize and separate the counselor and the purchase customer through the voiceprint analysis of the counseling voice.

The STT conversion module 704 may be configured to separate the counseling voice into a counseling inquiry and a counseling answer based on the voiceprint analyzed in real time by the counseling voiceprint analysis module 703, and STT-convert the counseling inquiry and the counseling answer.

The counseling inquiry AI analysis module 705 may be configured to analyze the type and the contents of the counseling inquiry STT-converted by the STT conversion module 704 in real time.

The customer emotion AI analysis module 706 may be configured to analyze the customer emotion based on the counseling inquiry STT-converted by the STT conversion module 704 in real time.

The AI coach control module 707 may be configured to control a coach for training the educated/inexperienced counselor based on the type and the contents of the counseling inquiry analyzed in real time by the counseling inquiry AI analysis module 705 and the customer emotion analyzed in real time by the customer emotion AI analysis module 706.

The AI avatar generation module 708 may be configured to generate an avatar for the counselor on the counseling video stored in the counseling video database 702 by the control by the AI coach control module 707.

The AI avatar video simulation module 709 may be configured to the AI avatar coach video by applying the avatar generated by the AI avatar generation module 708 to the counseling video stored in the counseling video database 702. In addition, the AI avatar video simulation module 709 may be configured to transmit the simulated AI avatar coach video to the educated/inexperienced counselor 800.

The educated/inexperienced counselor terminal 800 may be configured to receive and output the AI avatar coach video provided from the AI avatar coach server 700. The educated/inexperienced counselor may be trained through an actual counseling case by the AI avatar coach video, and learn the actual counseling case.

Meanwhile, the purchase customer database 602 stores purchase customer information for various selling company customers, and stores any one purchase customer with respect to each of various selling company customers. A customer integration module (not illustrated) may be configured to filter and integrate the purchase customer information stored in the purchase customer database 602 through a phone number, an address, a name, etc. In addition, an integrated customer big data analysis module (not illustrated) may determine whether the corresponding purchase customer satisfies or dissatisfies with goods or services of any selling company through the integrated purchase customer information, and this may be configured to analyze a preference for the selling company, the goods, and the services or satisfaction and dissatisfaction according to an age, a gender, a region, etc. of the integrated purchase customer. A big data analysis result through the integrated purchase customer information is provided to various selling company customers to be referenced for a strategy of the company.

The present invention has been described with reference to the exemplary embodiments. However, it will be appreciated by those skilled in the art that various modifications and changes of the present invention can be made without departing from the spirit and the scope of the present invention which are defined in the appended claims and their equivalents.

What is claimed is:

1. An AI avatar coaching system based on a free speech emotion analysis for acting for Customer Service (CS) managers, comprising:
   an AI avatar coach server generating an AI avatar coach video for practical counseling training, and providing the generated AI avatar coach video;
   an inexperienced counselor terminal receiving and outputting the AI avatar coach video provided from the AI avatar coach server;
   a purchase customer terminal performing a voice call for a counseling inquiry of a purchase customer;
   an experienced counselor terminal performing the voice call for a counselor to perform counseling processing for the counseling inquiry of the purchase customer; and
   an omni channel customer/company consulting service server setting a voice call session for the voice call between the purchase customer terminal and the experienced counselor terminal, and transmitting a report for the counseling inquiry and the counseling processing, in order to act for counseling services for multiple selling company customers.

2. The AI avatar coaching system based on a free speech emotion analysis for acting for Customer Service (CS) managers of claim 1, further comprising:
   a selling company customer terminal receiving the report for the counseling inquiry and the counseling processing for the multiple selling company customers; and
   a manager terminal receiving the report for the counseling inquiry and the counseling processing.

* * * * *